July 30, 1963    A. R. KAUFMANN    3,099,041
METHOD AND APPARATUS FOR MAKING POWDER
Filed March 8, 1961    5 Sheets-Sheet 1

FIG. 1

INVENTOR.
ALBERT R. KAUFMANN
BY

July 30, 1963 A. R. KAUFMANN 3,099,041
METHOD AND APPARATUS FOR MAKING POWDER
Filed March 8, 1961 5 Sheets-Sheet 3

FIG. 4

INVENTOR.
ALBERT R. KAUFMANN
BY

TUBULAR CONSUMABLE ELECTRODE

TUNGSTEN ELECTRODE

FIG. 7

POWDERED CONSUMABLE ELECTRODE ENCLOSED IN CONDUCTING TUBE

TUNGSTEN ELECTRODE

INVENTOR.
ALBERT R. KAUFMANN

FIG. 6

INVENTOR.
ALBERT R. KAUFMANN

United States Patent Office 3,099,041
Patented July 30, 1963

3,099,041
METHOD AND APPARATUS FOR MAKING POWDER
Albert R. Kaufmann, Lexington, Mass., assignor to Nuclear Metals, Inc., Concord, Mass., a corporation of Massachusetts
Filed Mar. 8, 1961, Ser. No. 94,299
8 Claims. (Cl. 18—2.6)

The present invention relates generally to an improved method and apparatus for making powder and, more particularly, to an improved method and apparatus for making powder from high melting point metals and like materials in the form of very fine spheroids or globules whose size and character are controlled.

Such powders find important uses in magnetic equipment, the manufacture of alloys, the preparation of nuclear fuel elements, and as shielding materials for nuclear reactors. The finer the size and the more uniform the character of the powder produced the more satisfactory is the blend which may be achieved with other materials likewise in the form of granules or powder. Present day techniques for making such powder are expensive, toilsome, and generally fall short of producing very fine-sized spheroids of comparatively uniform character.

The present invention contemplates a novel apparatus that is capable of producing powder in the form of very fine spheroids or globules of substantially uniform character and in a relatively simple and inexpensive manner. Furthermore, the production of powder by the novel apparatus of the invention takes place either in partial vacuum or in an inert atmosphere, e.g., argon or helium. The danger of atmospheric contamination of the powder produced is thus reduced to a negligible minimum. The present invention, moreover, contemplates the use of centrifugal force, in conjunction with heat, in a novel manner in which the powder in the form of very fine-sized spheroids or globules is formed directly from the molten end of a rotating rod or tube of metal or other material. This is achieved by heating a localized portion of a rotating material above its melting point whereby portions of the material are progressively thrown off by centrifugal force in the form of powder or, as more commonly referred to in the art, shot.

It is, therefore, a principal object of the present invention to provide an improved method and apparatus for making powder. More specifically, it is an object of the present invention to provide an improved method and apparatus for making very fine-sized spheroids from high melting point metals and like materials. It is another object of the invention to provide an improved method and apparatus for making very fine-sized spheroids or globules from high melting point metals in a manner in which the danger of atmospheric contamination is reduced to a negligible minimum. It is a further object of the invention to provide an improved method and apparatus for making powder by the utilization of centrifugal force, in combination with heat, in which the powder is formed directly from the molten end of a rotating metal or other material. It is still another object of the invention to provide an improved method and apparatus for making powder in the form of very fine spheroids or globules of substantially uniform size and character. It is a still further object of the invention to provide an improved method and apparatus for making powder in a relatively simple and inexpensive manner. Still another object of the present invention is to provide an improved method and apparatus for making powder in which the size and character of the powder produced may be controlled.

Other and further objects of the invention will in part be obvious and will in part appear hereinafter.

The invention accordingly comprises the improved method and apparatus possessing the construction, combination of elements, and arrangement of parts which are exemplified in the following detailed disclosure, and the scope of which will be indicated in the appended claims.

For a fuller understanding of the nature and objects of the invention, reference should be had to the following detailed description, taken in connection with the accompanying drawings wherein.

In general, each of the preferred embodiments of the apparatus for making powder herein illustrated comprises: a chamber; a means for introducing a material from which the powder is to be made within the chamber; a means for rotating the material within the chamber; a means for melting the material whereby portions of the rotating material are progressively thrown off by centrifugal force from the molten end thereof; a means for cooling the thrown off portions; and a means for collecting the portions.

Figure 1:
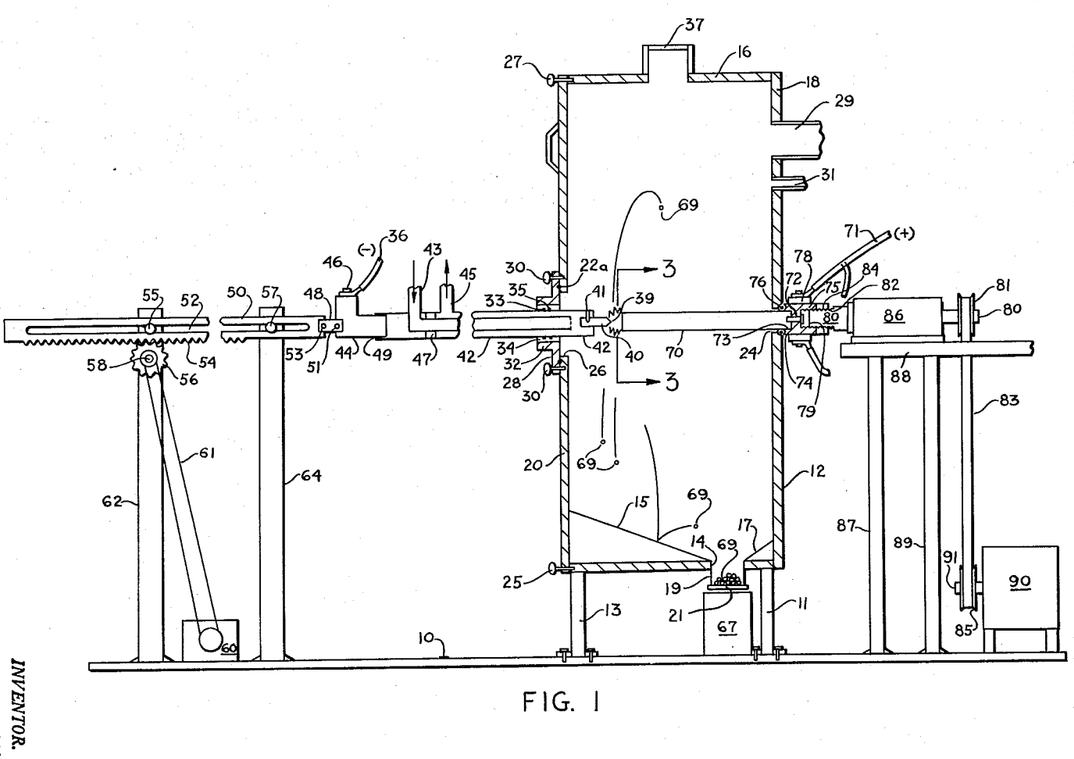
FIG. 1 is a side elevational view, in section, of one preferred apparatus for making powder embodying the present invention.

Referring to the drawings in which like reference characters refer to like parts throughout and in particular to FIG. 1, the reference character 10 denotes the base on which the apparatus of the invention is erected. This base 10 may consist of a wood or steel plate attached to a floor or it may consist of the floor itself. A chamber 12 is secured to the base 10 by suitable supporting plates 11 and 13 and is designed to accommodate the operative parts of the apparatus at a level above the floor at which those parts are within convenient reach of an operator. Chamber 12 may have any suitable configuration, as for instance, a cylindrical configuration. Side walls 18 and 20 of chamber 12 are provided with central co-axial holes 24 and 26 respectively in order to permit the introduction of the operative parts within chamber 12. Suitable wing nuts 25 and 27 removably secure side wall 20 to tubular wall 16. Wall 18 is provided with two ports: port 29 is provided for communicating with a pump (not shown) and port 31 for communicating with a tank (not shown) that may be filled with helium or argon gas. At the top of chamber 12 is provided an opening 37, closed by a sight glass, for enabling the operator to observe the performance of the apparatus in operation. Opening 14 cut in the bottom of chamber 12 is provided to accommodate chute 19 closed by trap door 21. Plates 15 and 17 are secured in the bottom of chamber 12 at an angle and terminate at opening 14 to cooperate with chute 19. A disc-like member 28 having a concentric sleeve 32 is removably secured to side wall 20 by wing nuts 30, 30.

An O ring 22a placed within suitable grooves formed in side wall 20 and disc-like member 28 at the interfaces thereof assures the airtight attachment of member 28 to side wall 20. An insulator sleeve 34 provided with appropriate grooves to receive O rings 33 and 35 is secured within concentric sleeve 32 of disc-like member 28.

One operative part to be introduced within chamber 12 consists of a conventional electrode 40, preferably formed of tungsten, secured by set screw 41 to a water cooled conductor 42. Conductor 42 is formed to be telescopically received within concentric sleeve 32 of disc-like member 28. An elbow piece 44 is silver soldered to conductor 42 as at 49 to accommodate joint 46 with electric lead 36. Lead 36 is connected to a conventional direct current power supply (not shown). Conductor 42 is water cooled, water being admitted into conductor 42 through pipe 43, hence traveling along the length of conductor 42 and being returned therefrom through pipe 45, as shown by the arrows in FIG. 1. Since conductor 42 is live during operation of the apparatus, it is preferably enclosed within a suitable protective insulating sleeve (not shown) to shield the operator from contact therewith. Conductor 42 is connected to member 50 by an insulator plate 48 attached to conductor 42 by bolt 51 and to member 50 by bolt 53. Member 50 is provided with a horizontal slot 52 and rack 54 to cooperate with pinion 56 mounted on shaft 58 rotatably secured in supporting column 62. Pinion 56 is driven by endless belt 61 connected to variable and reversible speed motor 60. A second supporting column 64 is secured to base 10 in a spaced apart relation with respect to column 62. Pins 55 and 57 carried in the upper ends of columns 62 and 64 respectively are provided to extend through slot 52 of member 50. Horizontal motion in translation is imparted to member 50 by angular motion of pinion 56 cooperating with rack 54. This motion is transmitted to conventional electrode 40 by conductor 42. Electrode 40 may thereby be entirely withdrawn from chamber 12 or it may be extended deep within the interior of chamber 12, according to the operative requirements of the apparatus of the invention. The extent of horizontal motion in translation of conventional electrode 40 depends upon the selected length of slot 52 of member 50, as may be further evident from viewing FIG. 1.

The other operative part to be introduced witin chamber 12 consists of a consumable electrode 70, representing the material from which the powder is made. Consumable electrode 70 may be formed of any high melting point metal or like material such as, for example, steel, zirconium, molybdenum, tantalum, columbium, beryllium and their alloys, copper clad uranium dioxide, and copper clad mixture of ceramic grade uranium dioxide and zirconium dioxide. Consumable electrode 70 is secured by screw 72 to the central shank portion 75 of connecting member 74. Connecting member 74 is formed with a smooth forward bore 73 designed to receive a portion of consumable electrode 70 and with an internally threaded rear bore 79 designed to receive externally threaded portion 82 of spindle 80. Spindle 80 is firmly secured to connecting member 74 by an internally threaded lock nut 84. A seal 76 positioned in a suitable groove between side wall 18 and connecting member 74 serves to achieve airtight and insulated connection between wall 18 and member 74. A carbon brush 78 is placed about connecting member 74. Brush 78 is connected by electric lead 71 to the positive pole of a direct current power supply (not shown). Hole 24 in wall 18 effectively insulates consumable electrode 70 from chamber 12. Spindle housing 86 is designed to slide within appropriate channels formed in supporting plate 88 resting on columns 87 and 89. Spindle 80 is rotated by endless drive belt 83 connecting sheave 81, attached to spindle 80, with drive pulley 85 attached to drive shaft 91 of electric motor 90.

The operation of the preferred embodiment of the apparatus of the invention above described with reference to FIG. 1, is as follows. A high melting point metal or like material is formed in any convenient manner into a consumable electrode 70. Electrode 70 is then secured within the smooth forward bore 73 by screw 72 to the central shank portion 75 of connecting member 74. At this point, spindle housing 86 is positioned at the end of its supporting plate 88 farthest from side wall 18 of chamber 12. Spindle 80 is then anchored within the internally threaded rear bore 79 of connecting member 74 by tightening of lock nut 84. Spindle housing 86 is moved forward on its supporting plate 88 until connecting member 74 makes contact with side wall 18 of chamber 12, with the seal 76 being properly in its place. Consumable electrode 70 has thus been properly introduced within chamber 12 through central hole 24 provided in wall 18. Thereafter, conventional electrode 40 is introduced within chamber 12 through concentric sleeve 32 of disc-like member 28 secured to wall 20. It is to be noted that conventional electrode 40 and consumable electrode 70 may be axially aligned in a manner in which the pointed end 39 of conventional electrode 40 points precisely at the center of rod-like consumable electrode 70 or, that conventional electrode 40 may be moved off the axis of consumable electrode 70. The choice of either axial alignment or eccentric alignment depends upon the desired powder production as well as on the material comprising the consumable electrode 70. When the conventional electrode 40 is positioned eccentric with respect to the consumable electrode 70, the spray of powder production becomes concentrated at an angle. This phenomenon allows for a chamber 12 of considerably smaller construction than is the case where the two electrodes are axially aligned. The distance between the pointed end 39 of conventional electrode 40 and the end of consumable electrode 70 should be so chosen that an electric arc may be easily struck therebetween once the power is turned on. Selection of this distance will, of course, depend upon such factors as the applied arc current, arc voltage, size and composition of consumable electrode 70, and the desired rate and size of powder production. This selected distance will hereinafter be simply referred to as the equilibrium spacing between the electrodes.

The interior of chamber 12 is then evacuated via valved port 29 to an internal vacuum of about five microns of mercury, rendering thereby the interior of chamber 12 substantially devoid of contaminating gases and impurities. Argon, helium, or some other inert gas is thereafter admitted into the interior of chamber 12 through valved port 31, providing an inert gas atmosphere within chamber 12. Electric motor 90 is then switched on, causing spindle 80 to spin which in turn imparts the desired rotational speed to consumable electrode 70 rotating within chamber 12. Circulating water is thereafter caused to flow through pipes 43 and 45 along the forward portion of conductor 42, with copper plug barrier 47 preventing rearward flow of the water. Power connections are made to a direct current power supply via electric leads 36 and 71 and simultaneously therewith variable speed motor 60 is switched on. In order to strike an electric arc between the two electrodes without an actual physical contact between the ends of the two electrodes, however, it is also necessary to connect leads 36 and 71 into a high frequency alternating current power supply. This high frequency alternating current provides the initial spark by which an electric arc is struck between the ends of conventional electrode 40 and rotating consumable electrode 70. Once the arc has been struck, the high frequency alternating current power supply is turned off. Heat generated by the electric arc progressively melts the end of rotating consumable electrode 70, causing there an ever present molten pool 68 to be formed. Due to the centrifugal force occasioned by the rotational velocity of consumable electrode 70, small drops 65 of molten metal are continuously being formed at the periphery 66 of the molten pool 68, as may be best observed in FIG. 3. These small drops 65 are progressively being thrown off by the action of the same centrifugal force from the periphery 66 of the molten pool 68 in the form of very fine spheroids or globules 69 or, as more conventionally designated in the art, shot. Equilibrium spacing between the electrodes 40 and 70 is being maintained by progressive forward motion of conventional electrode 40 being transmitted thereto through member 50. Member 50 in turn is moved in translation by the combined action of rack 54 and pinion 56 driven by variable and reversible speed motor 60 through endless belt 61. The powder or shot 69 are thrown off from the periphery 66 of the molten pool 68 and are solidified prior to their impingement on plates 15 and 17 forming two inclined planes at the bottom of chamber 12, substantially as may be observed in FIG. 1. From plates 15 and 17, the powder or shot 69 rebound and eventually fall by gravity into chute 19. At the conclusion of the powder forming process, the apparatus is shut off, and the powder or shot 69 produced is collected in a suitable receptacle 67 by simply opening trap door 21 located at the lower end of powder collecting chute 19.

Figure 2:
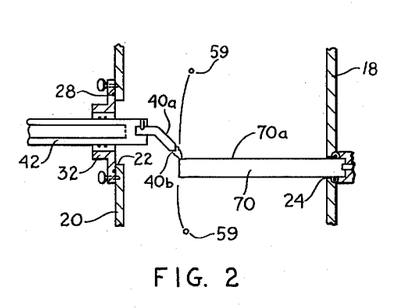
FIG. 2 depicts a modification in the apparatus as shown in FIG. 1.

A modification in the apparatus as shown in FIG. 1 is depicted in FIG. 2. As may be observed, in lieu of the central co-axial hole 26, an off center hole 22 is provided in wall 20 of chamber 12. Water-cooled conductor 42 is introduced through this off center hole 22 within the interior of chamber 12. It is to be noted that the axes of conductor 42 and of consumable electrode 70 are in a parallel spaced apart relationship to one another. It is also to be noted that conventional electrode 40a is mounted at an angle on the end of conductor 42, substantially as shown. The pointed end 40b of electrode 40a is positioned at a distance from the outer periphery 70a of the rotating consumable electrode 70. This distance represents the equilibrium spacing for this modification. Heat generated by an electric arc struck between the pointed end 40b of electrode 40a and the outer periphery 70a of rotating consumable electrode 70 progressively melts the rotating consumable electrode 70 at its outer periphery 70a. Small drops 59 of molten material are then continuously being thrown off directly from this outer periphery 70a by centrifugal force occasioned by the rotational velocity of electrode 70. Electrode 40a is caused to advance at a predetermined rate along the axial length of the rotating consumable electrode 70. If the consumable electrode 70 is of a diameter that is not consumed by one advance, then electrode 40a is caused to move in reverse. This process of forward and reverse motion of electrode 40a along the axial length of consumable electrode 70 is repeated until electrode 70 is consumed. In order to maintain the electric arc between the pointed end 40b of electrode 40a and the outer periphery 70a of electrode 70, it may become necessary to increase the arc current and/or arc voltage by a predetermined amount at each successive forward motion of conductor 42.

The modification shown in FIG. 2 and described above is particularly well suited for very fine-sized powder production. In addition, this arrangement also permits a greater degree of control over the diameter of the powder produced. As a result, the pwoder produced is of substantially uniform size and character.

Figure 4:
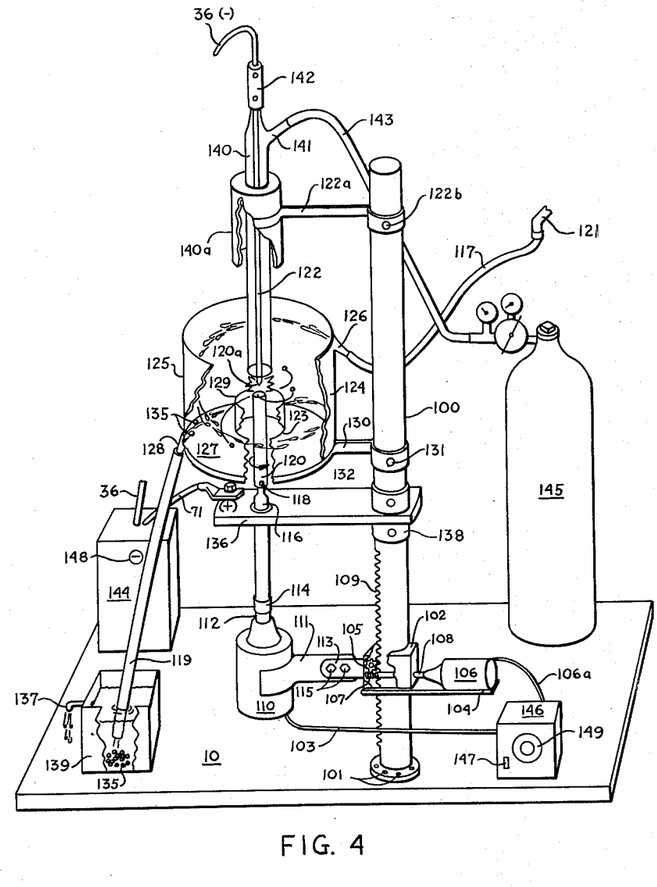
FIG. 4 is a perspective view of another preferred apparatus for making powder embodying the present invention.

Another preferred embodiment of apparatus for making powder is shown in a perspective view in FIG. 4. A supporting pillar 100 is securely fastened to base 10 by bolts 101. The operative parts of this embodiment of the apparatus are operatively mounted in a vertically spaced apart relationship on pillar 100. At the bottom portion of pillar 100 is mounted a vertically slidable block 102 having a plate 104 attached to the lower side thereof. Plate 104 carries a small electric motor 106 whose shaft 108 terminates in a worm 107 within slidable block 102. Worm 107 is designed to cooperate with gear 105 which also serves as a pinion meshed with rack 109 formed on the bottom portion of pillar 100. A vertically positioned electric motor 110 is removably secured to slidable block 102 by suitable nuts and bolts 115 passing through appropriately superimposed holes formed in both the bifurcated arm 111 welded to motor 110 and the flange 113 welded to block 102. Shaft 112 of electric motor 110 is connected to a stem 116 by an insulating ring 114. Consumable electrode 120 in turn is secured to stem 116 as at 118.

A cylindrical container 124 supported by a ring 132 having an arm 130 is secured to pillar 100 as at 131 about the middle portion thereof. Container 124 is composed of a circular wall 125, a bottom wall 127 having a concentric hole 123, and an inner circular wall 129 rising from the periphery of hole 123 to a height of preferably less than one half the height of outer circular wall 125. An inlet spout 126 is formed tangentially near the upper periphery of circular wall 125 to admit liquid into the interior of cylindrical container 124. A tube 117 serves to connect inlet spout 126 with a valved liquid source, such as for example a water main 121. Liquid admitted into the interior of cylindrical container 124 through inlet spout 126 forms a circulating wall of liquid about the inner circumference of circular wall 125. This liquid is continuously being withdrawn from the interior of container 124 at about the same rate as it is being admitted therein through an outlet spout 128 formed tangentially near the lower periphery of circular wall 125 and at a point diametrically opposed from inlet spout 126. Liquid being discharged through outlet spout 128 is carried by pipe 119 into a receptacle 139. Rotatable consumable electrode 120 described above is introduced within cylindrical container 124 from the bottom thereof through concentric hole 123.

Conventional electrode 122 is co-axially mounted with and in a vertical plane above rotatable consumable electrode 120. The lower end of conventional electrode 122 extends well within cylindrical container 124, with the lower end of electrode 122 being located somewhat spaced above the upper periphery of inner circular wall 129. Conventional electrode 122 is furthermore enveloped by a glass tube 140 provided with a cork-like member 140a having an arm 122a by which conventional electrode is secured to the upper end portion of pillar 100 as at 122b. An insulated sleeve 142 provided at the upper end of glass tube 140 serves to connect the upper end of conventional electrode 122 with electric lead 36. Immediately below insulated sleeve 142, glass tube 140 is provided with an inlet 141 connected by a tube 143 to a valved gas tank 145 storing helium, argon or some other inert gas under pressure. A carbon brush 136 is mounted about stem 116 somewhat spaced below cylindrical container 124 to complete an electrical circuit between consumable electrode 120 and conventional electrode 122. Carbon brush 136 is attached by an insulating ring 138 to pillar 100 at a point just above rack 109. Brush 136 is connected by electric lead 71 to a conventional electrical welding supply source 144, to which electric lead 36 is likewise connected. A switch box 146, located to the right of pillar 100 on base 10, completes the required parts of this embodiment of the apparatus for making powder. Switch box 146 is provided with plugged connection into a conventional alternating current power supply (not shown). Leads 103 and 106a connect switch box 146 with electric motors 110 and 106 respectively. Knob 149 is provided on switch box 146 to vary the rotational speed of motor 106.

The principle of operation of this embodiment of the apparatus for making power above described with reference to FIG. 4 is essentially the same as already explained with reference to the apparatus shown in FIGS. 1 and 3. A consumable electrode 120, formed of a high melting point metal or like material, is secured to stem 116 of electric motor 110 as at 118, and introduced within cylindrical container 124 from the bottom thereof through concentric hole 123. The extent of introduction of consumable electrode 120 through concentric hole 123 is such that an equilibrium spacing between electrodes 120 and 122 is achieved so that an electric arc may conveniently be struck therebetween. The valves of both gas tank 145 and water main 121 are opened, admitting a helium, or argon, or some other inert gas into the immediate vicinity of the opposed ends of electrodes 120 and 122 and a continuously circulating wall of liquid surrounding the just created body of inert atmosphere within cylindrical container 124. Switches 147 and 148 are then thrown, causing thereby both electric motors 106 and 110 to rotate as well as an electric arc to be struck between the opposed ends of the now rotating consumable electrode 120 and the stationary conventional electrode 122. Heat generated by this electric arc progressively melts the end of the rotating consumable electrode 120 creating there a molten pool 120a. Powder formation at this molten pool 120a proceeds precisely in the same manner as already described with reference to FIG. 3. Globules or shot 135 are continuously being thrown off tangentially from the periphery of the molten pool 120a by the action of centrifugal force occasioned by the rotational velocity of rotating consumable electrode 120. The globules or shot 135 are water quenched as they enter the circulating body of water and are continuously being washed out through outlet spout 128 and tube 119 into receptacle 139. An escape spout 137 provided in the upper portion of receptacle 139 permits the discharge of waste water therefrom. Equilibrium spacing between the opposed ends of electrodes 120 and 122 is continuously being maintained by the progressively upward motion of rotating consumable electrode 120 brought about by the combined action of electric motor 106, its rotating shaft 108 terminating in worm 107, and combination gear and pinion 105 cooperating with rack 109 on pillar 100. Thus an electric arc is continuously being maintained between electrodes 120 and 122 until consumable electrode 120 is consumed by the production of powder 135 therefrom.

Figures 5, 5A, 7, 8:
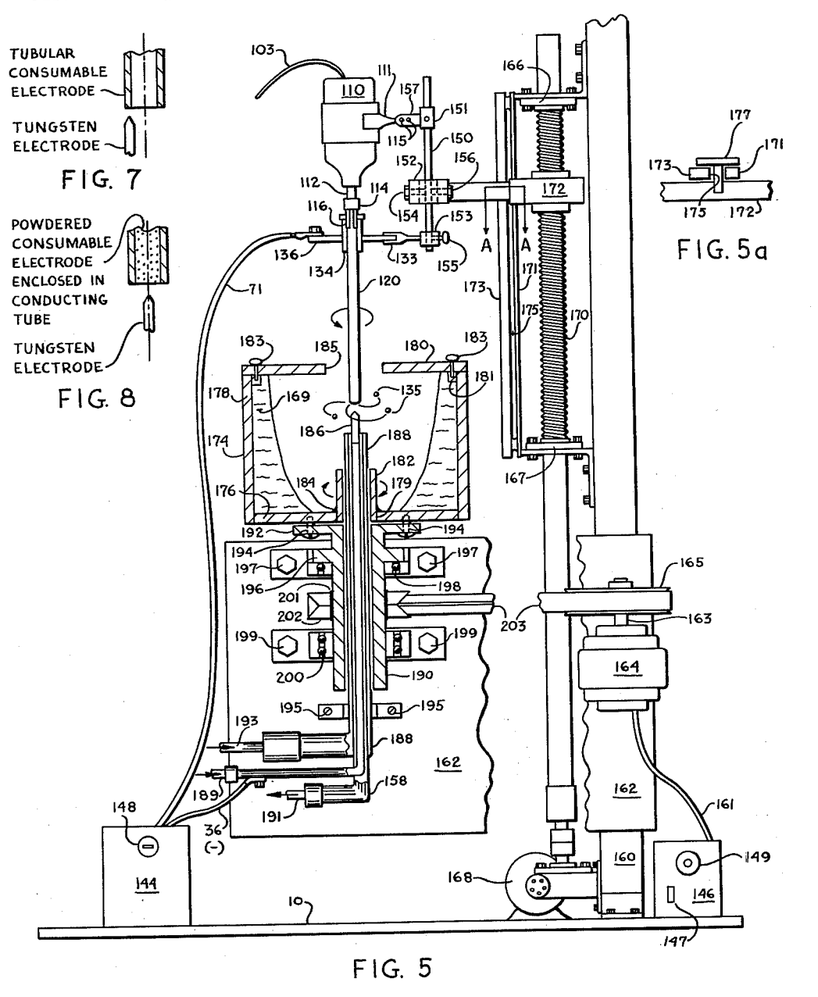
FIG. 5 is a side elevational view, partly in section, of still another preferred apparatus for making powder embodying the present invention.
FIG. 5a is a section of a portion of the apparatus of FIG. 5 taken along the line a—a.
FIGS. 7 and 8 illustrate two preferred ways of positioning of the tungsten electrode with respect to the consumable electrode.

In FIG. 5 is shown a side elevational view, partly in section, of still another preferred embodiment of an apparatus for making powder. In this embodiment, a framework 160 attached to base 10 carries the operative parts of the apparatus at varying levels above the base 10. A steel plate 162 disposed in a vertical plane and attached to the lower portion of framework 160 carries a small electric motor 164 and also rotatably supports cylindrical can 174 by an upper roller bearing assembly 198 and a lower roller bearing assembly 200 operatively mounted on plate 162. Between upper and lower bearing assemblies 198 and 200 is mounted a sheave 202 welded or otherwise secured as at 201 to supporting sleeve 190. Supporting sleeve 190 is provided with a carrying disc 192 and a flange 196 at its upper end. Flange 196 of sleeve 190 is rotatably mounted in upper bearing assembly 198 secured to plate 162 by suitable bolts 197, 197. Lower bearing assembly 200, surrounding sleeve 190 at the lower portion thereof, is secured to plate 162 by suitable bolts 199, 199. Sheave 202 is connected by endless belt 203 to drive pulley 165 mounted on shaft 163 of electric motor 164. Cylindrical can 174 composed of side wall 178, bottom wall 176 and top wall 180 is removably secured to carrying disc 192 of supporting sleeve 190 by suitable set screw 194, 194 extending through holes drilled in disc 192 and bottom wall 176. Both bottom and top walls 176 and 180 are provided with concentric holes 179 and 185 respectively. An inner sleeve 182 is welded within concentric hole 179 as at 184 and extends within cylindrical can 174 at a distance of about one-third of the height of can 174. The top wall 180 of can 174 is removably secured to an abutment 181, welded to the top inner periphery of side wall 178, by convenient wing nuts 183, 183.

Conventional electrode 186, designed for introduction within rotatable cylindrical can 174, is mounted within a stationary outer sleeve 188 telescopically to be received wtihin inner sleeve 182 of rotatable can 174 and within supporting sleeve 190. Outer sleeve 188 of conventional electrode 186 is furthermore securely fastened to steel plate 162 by suitable clamps 195, 195 at a point just below where supporting sleeve 190 ends. Conventional electrode 186 is furthermore provided with an inner sleeve 158 made of suitable insulating material and conveniently designed to carry continuously circulating cooling liquid such as, for example, water along the axial length of electrode 186. Cooling liquid may be continuously admitted within inner sleeve 158 of conventional electrode 186 through inlet pipe 189 and may be continuously withdrawn from within inner sleeve 158 through outlet pipe 191. Helium, argon, or some other inert gas may continuously be admitted through pipe 193 passing along the length of electrode 186 between outer sleeve 188 and inner insulating sleeve 158 and being flushed out within cylindrical can 174 about the upper end of conventional electrode 186. An inert gas atmosphere is thus created within can 174 materially reducing the danger of atmospheric contamination therein.

Consumable electrode 120 is rotatably secured to stem 116 by a tubular member 134. Stem 116 is secured to shaft 112 of electric motor 110 by an insulating ring 114. Electric motor 110 is attached to a rod 150 by a ring 151 having a flange 157 bolted by bolts 115 to the bifurcated arm 111 of motor 110. Rod 150 is disposed in a parallel spaced apart relationship to the rotational axis of motor 110 and is adjustably secured to a sliding member 172. At the lower portion of rod 150 a carbon brush 136 is removably attached thereto by an insulating arm 133 having a ring 153 and a set screw 155. Carbon brush 136 is connected by electric lead 71 to a conventional welding supply 144. Conventional electrode 186 is likewise connected to the same welding supply 144 by electric lead 36, completing thereby an electrical circuit between the electrodes 120 and 186. Sliding member 172 is essentially an internally threaded ring designed to travel along the externally threaded portion of rod 170 rotatably secured within an upper bracket 166 and a lower bracket 167 and rotated by an electric motor 168 attached to the base 10. Brackets 166 and 167 are furthermore conveniently secured to the framework 160. To keep sliding member 172 from rotating, a knob 177 removably secured to member 172 is designed to slide within a channel 175 formed by parallel spaced guide bars 171 and 173, as may be best observed in FIG. 5a. These guide bars 171 and 173 are likewise attached to brackets 166 and 167. Sliding member 172 is furthermore provided with a yoke 152 designed securely to hold therein rod 150 by set screws 154 and 156. A switch box 146 designed for plugged in connection into a conventional alternating current power supply (not shown) completes the necessary parts of this embodiment of an apparatus for making powder. Switch box 146 is connected by electric lead 161 to motor 164, by lead 103 to motor 110, and is also connected by lead (not shown) to motor 168. A knob 149 provided on switch box 146 is intended to vary the rotational speed of electric motor 168 responsible for the rate of downward descent of consumable electrode 120.

The operation of the above described embodiment of an apparatus for making powder is analogous to that described with respect to the embodiment shown in FIG. 4. Cylindrical can 174 is filled with a liquid, preferably water, to a level of not exceeding the height of inner sleeve 182. Consumable electrode 120 is then rotatably secured by tubular member 134 to stem 116 and the equilibrium spacing between the ends of electrodes 120 and 186 is adjusted by securing rod 150 within yoke 152 of sliding member 172 by tightening set screws 154 and 156. Then switches 147 and 148 are thrown: causing motor 164 to rotate cylindrical can 174 creating thereby a circulating wall of liquid 169 therein; causing motor 110 to rotate consumable electrode 120; causing motor 168 to rotate rod 170 moving thereby sliding member 172 slowly downward which in turn moves rotating consumable electrode 120 downward; and also causing an electric arc to be struck between the end of electrodes 120 and 186. Simultaneously with the throwing of switches 147 and 148, continuously circulating water is being admitted through inlet pipe 189 and withdrawn through outlet pipe 191 to cool conventional electrode 186, and also helium, argon, or some other inert gas is admitted through gas pipe 193 to be flushed out about the ends of electrodes 120 and 186. As a result of the heat generated by the electric arc between the ends of electrodes 120 and 186, a molten pool 120a is being formed at the end of consumable electrode 120. Powder formation from this molten pool 120a is identical with that already described with reference to FIG. 3. Spheroids or shot 135 are continuously being thrown off from the periphery of the molten pool 120a by the action of centrifugal force engendered by the rotational velocity of the rotating consumable electrode 120. The spheroids 135 are water quenched as they enter the circulating body of water 169. Equilibrium spacing between the opposed ends of electrodes 120 and 186 is continuously being maintained by the progressively downward motion of rotating consumable electrode 120 brought about by the combined action of electric motor 168 rotating rod 170, and the progressively downward movement of sliding member 172 secured to rod 150 which in turn carries electric motor 110 to whose shaft 112 the rotating consumable electrode 120 is attached. Thus an electric arc is continuously being maintained between the ends of electrodes 120 and 186 until consumable electrode 120 is consumed by the production of powder 135 therefrom. The produced powder may then be conveniently collected by removing cylindrical can 174 through unscrewing set screws 194, 194 and draining its contents through an appropriate filter.

In the case of some materials, it may be more desirable to produce powder while the material is entirely submerged within a body of quenching liquid, whether the liquid be water or some other fluid such as, for instance, liquid salt. For such applications, the apparatus shown in FIG. 5 is operated as follows. Cylindrical can 174 is filled up all the way with the selected liquid. Motor 164 is shut off from the power supply, causing thereby cylindrical can 174 not to rotate but rather to remain stationary. After motor 110 has brought consumable electrode 120 to the required rotational velocity, an inert gas such as, for instance, argon is pumped in at elevated pressure through gas pipe 193 to be flushed out about the ends of electrodes 120 and 186. Power connections are then made to a high frequency alternating current power supply to initiate an electric arc between the two electrodes, with the insert gas acting as an ionized medium in the vortex formed about the ends of electrodes 120 and 186. The vortex is formed as a result of the combined actions of the rotational speed of consumable electrode 120 and of the bubbling effect of the inert gas being flushed out at elevated pressure about the ends of electrodes 120 and 186. Once the arc has been struck, the high frequency alternating current is turned off and the arc is maintained by a conventional direct current power supply. The powder production is similar to that as already described above with the exception that a much more rapid quenching is achieved here due to the fact that the spheroids 135 enter the quenching liquid almost as soon as they are being thrown off from the periphery of the molten pool 120a.

Figure 6:
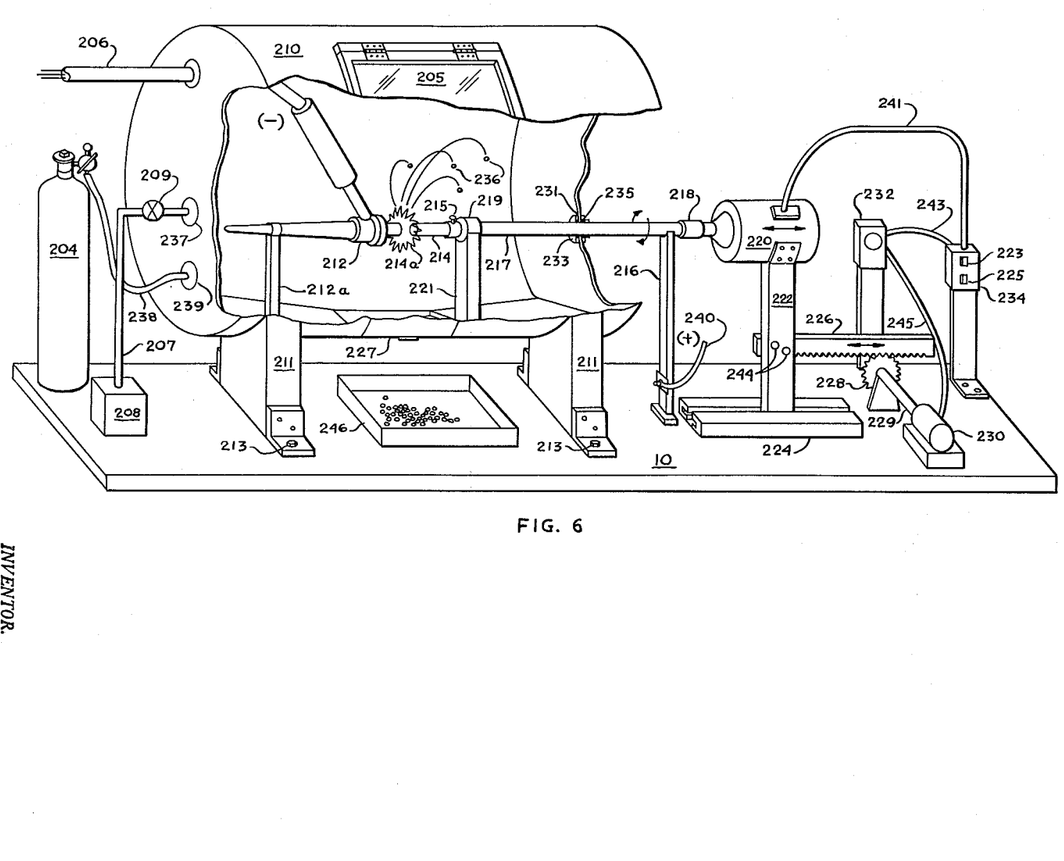
FIG. 6 is a perspective view, with parts broken away, of still another preferred apparatus for making powder embodying the present invention.

FIG. 6 is a perspective view, with parts broken away, of still another preferred embodiment of an apparatus for making powder. In this embodiment, a cylindrical chamber 210 is secured to the base 10 by convenient supports 211, 211 bolted thereto as at 213, 213. Within cylindrical chamber 210 is mounted a heliarc torch 212 of known design and being connected to a power source (not shown) by lead 206. It is to be understood that a contional electrode of similar design and construction as described with reference to the previous embodiments may also be employed here in lieu of the heliarc torch 212 if so desired. Heliarc torch 212 is supported within chamber 210 in operative condition by a suitable supporting arm 212a secured to the bottom inner wall of chamber 210. There are several ports and openings in the walls of cylindrical chamber 210: opening 205, hinge-like closed by a sight glass, for enabling the operator to reach within the chamber 210 before and after operation as well as to observe the performance of the apparatus during operation; opening 227, closed by a trap door, for removing the powder or shot 236 produced at the end of operation; port 231, provided with an insulating ring 233 having double O rings 235 embedded therein, for permitting the introduction of the shaft 217 of electric motor 220 within chamber 210; port 237 for connection through pipe 207 with a pump 208; and port 239 for connection through hose 238 with gas tank 204.

Electric motor 220 is mounted for horizontal motion in translation on a plate 222 designed for slidable motion within a suitable channel 224. Such horizontal motion in translation is imparted to motor 220 by a rack 226, bolted to plate 222 as at 244, and a pinion 228 secured to shaft 229 of electric motor 230. In order to control the rotational speed of motor 230, a separate control box 232 may be provided, having connections to both motor 230 through lead 245 and to switch box 234 through lead 243. Electric motor 220 is directly connected to switch box 234 through lead 241. A carbon brush 216 is mounted in association with shaft 217 of motor 220 and is connected to the positive pole of a power source (not shown) by lead 240. Shaft 217, furthermore, is provided with insulating rings 218 and 219 near its terminal points, and is supported within chamber 210 by a suitable post 221 attached to the bottom inner wall of chamber 210. A consumable electrode 214 from which the powder or shot is to be produced is conveniently secured to shaft 217 by a set screw 215.

It must be pointed out that the embodiment of the apparatus for making powder shown in FIG. 6 is primarily designed for making powder from non-conducting or semi-conducting materials such as, for example, ceramic grade uranium dioxide or a mixture of uranium dioxide and zirconium dioxide. The principle of operation of this embodiment of the apparatus, however, is essentially the same as that described with reference to the previously explained embodiments. A consumable electrode 214 is inserted through opening 205 within cylindrical chamber 210 and is secured to shaft 217 of motor 220 by set screw 215. The interior of chamber 210 is then evacuated through pipe 207, having a valve 209 and being connected to a pump 208, to an internal vacuum of about five microns of mercury, rendering thereby the interior of chamber 210 substantially devoid of contaminating gases and impurities. Helium, argon, or some other inert gas is then admitted into the interior of chamber 210 through hose 238 connecting gas tank 204 with port 239. Heliarc torch 212 is turned on and switches 223 and 225 are closed. Heat generated by the heliarc torch 212 progressively melts the end of the now rotating consumable electrode 214, creating there a molten pool 214a. Powder or shot 236 formation from the periphery of this molten pool 214a is the same as already described with reference to FIG. 3. Equilibrium spacing between heliarc torch 212 and the end of consumable electrode 214 is continuously being maintained by the progressively forward motion in translation of electric motor 220 moved by the combined action of pinion 228 and rack 226 actuated by electric motor 230. At the end of powder formation, trap door 227 is opened and the powder produced is conveniently collected in a receptacle 246.

FIGS. 7 and 8 illustrate two alignments of the end of the conventional electrode with respect to the consumable electrode. In the event that the consumable electrode is formed as a tube or when it is desired that powder production be concentrated at an angle, then the pointed end of the conventional electrode is positioned eccentric with respect to the consumable electrode, as shown in FIG. 7. For some materials, however, axial alignment of the electrodes, as shown in FIG. 8, is preferred. This is particularly true with respect to a consumable electrode composed of ceramic grade powder densely packed within a conducting tube.

The size and character of the powder or shot produced in any of the above described embodiments of apparatus for making powder depend upon the selection and control of the following factors: arc current and arc voltage; feed rate of the consumable electrode; rotational velocity of the consumable electrode; radius of the consumable electrode; and surface tension and density of the consumable electrode. This may be best illustrated by the following examples.

*Example I*

Figure 3:
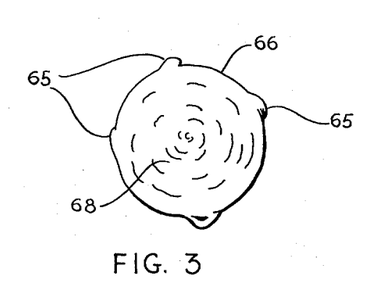
FIG. 3 is a plan view of the molten end of the rotating consumable electrode about to throw off three fractions therefrom by centrifugal force and taken along the line 3—3 of FIG. 1.

Apparatus of the type illustrated in FIGS. 1 and 3 was used. A consumable electrode formed of stainless steel and having a diameter of ¼ of one inch was rotated at a velocity of 12,000 r.p.m. The arc current was 100 amperes. After the interior of chamber 12 was pumped out to a vacuum of about five microns of mercury, it was filled with helium gas. The powder produced were small spheroids having a substantially uniform diameter of about 200 microns.

*Example II*

Apparatus of the type illustrated in FIG. 6 was employed. A consumable electrode was formed by swaging a ⅜ inch outside diameter and ¼ inch inside diameter copper tube loosely filled with a ceramic-grade uranium dioxide powder. The final density of the uranium dioxide within the copper tube was determined to be approximately 47% of theoretical. The diameter of the uranium dioxide core was approximately ⅛ of one inch. This consumable electrode was brought to a rotational velocity of 12,000 r.p.m. and its end was progressively melted by a heliarc torch. The powder produced consisted of spheroids: some formed of copper and others formed of uranium dioxide. The uranium dioxide spheroids had a predominant size range from about 100 to about 200 microns in diameter.

The present invention thus provides an improved method and apparatus for making powder in the form of very fine-sized spheroids or globules which is formed directly from the molten end of a rotating metal or other material.

Since certain changes may be made in the above described method and apparatus without departing from the scope of the invention herein involved, it is intended that all matter contained in the above description or shown in the accompanying drawings shall be interpreted in an illustrative and not in a limiting sense.

What is claimed is:

1. Apparatus for making fine powder of uniform character and not exceeding in size 200 microns in diameter comprising a chamber, means for introducing a tubular consumable electrode within said chamber, means for rotating said consumable electrode within said chamber, a conventional electrode operatively mounted within said chamber and in cooperation with said rotating consumable electrode, with the longitudinal axes of said tubular consumable electrode and of said conventional electrode being disposed in a parallel but spaced apart relation, means for maintaining an electric arc between said rotating consumable electrode and said conventional electrode progressively to melt said rotating consumable electrode whereby uniformly shaped portions not exceeding 200 microns in diameter of said rotating tubular consumable electrode are progressively thrown off by centrifugal force from the molten end thereof, and means for collecting said portions.

2. Apparatus for making fine powder of uniform character and not exceeding in size 200 microns in diameter comprising a chamber, means for horizontally introducing a tubular consumable electrode within said chamber, means external of said chamber for rotating said consumable electrode within said chamber, a conventional electrode operatively mounted within said chamber and in cooperation with said rotating consumable electrode, with the longitudinal axes of said tubular consumable electrode and of said conventional electrode being disposed in a parallel and spaced apart relation, means for cooling said conventional electrode, means for maintaining an electric arc between said rotating consumable electrode and said conventional electrode progressively to melt said rotating consumable electrode whereby uniformly shaped portions not exceeding 200 microns in diameter of said rotating tubular consumable electrode are progressively thrown off by centrifugal force from the molten end thereof, means external of said chamber for progressively moving in translation said conventional electrode toward said progressively melting and rotating consumable electrode, means for evacuating said chamber to partial vacuum, and means for collecting said portions.

3. A method for making fine powder of uniform character and not exceeding in size 200 microns in diameter comprising the steps of introducing a material from which powder is to be made within a chamber at one side thereof, introducing a means for melting said material within said chamber at the other side thereof, rotating said material within said chamber, said material and said means being coaxially aligned, progressively melting said material to form liquid drops at one end thereof, allowing said liquid drops to acquire the peripheral velocity of said rotating material, and progressively casting off said liquid drops by centrifugal force from said one end of said rotating material.

4. A method for making fine powder of uniform character and not exceeding in size 200 microns in diameter comprising the steps of introducing a tubular consumable electrode within a chamber at one side thereof, introducing a conventional electrode within said chamber at the other side thereof, with the longitudinal axes of said tubular consumable electrode and of said conventional electrode being disposed in a parallel and spaced apart relation, evacuating said chamber to a partial vacuum, introducing inert gas within said chamber, striking an electric arc within said chamber between said consumable electrode and said conventional electrode, rotating said consumable electrode within said chamber while maintaining said electric arc, progressively melting said tubular consumable electrode to form liquid drops at one end thereof, allowing said liquid drops to acquire the peripheral velocity of said rotating tubular consumable electrode, and progressively casting off said liquid drops by centrifugal force from said one end of said rotating tubular consumable electrode.

5. A method for making fine powder of uniform character and not exceeding in size 200 microns in diameter comprising the steps of introducing a consumable electrode within a chamber at one end thereof, mounting in coaxial alignment with said consumable electrode a heli-arc torch within said chamber at the other end thereof, evacuating said chamber to a partial vacuum, rotating said consumable electrode within said chamber, progressively melting said consumable electrode to form liquid drops at one end thereof, allowing said liquid drops to acquire the peripheral velocity of said rotating consumable electrode, and progressively casting off said liquid drops by centrifugal force from said one end of said rotating consumable electrode.

6. A method for making fine metallic powder of uniform character and not exceeding in size 200 microns in diameter comprising the steps of introducing a rod-like metallic material having an outer periphery from which powder is to be made within a chamber, introducing a means for melting said material at its said outer periphery within said chamber, rotating said material within said chamber, and progressively melting said rod-like material at its said outer periphery to form liquid drops thereon, and progressively casting off said liquid drops by centrifugal force from said outer periphery of said rod-like metallic material.

7. Apparatus for making fine metallic powder comprising a chamber, means for introducing a rod-like metallic material having an outer periphery from which powder is to be made within said chamber, means for rotating said material within said chamber, means for introducing a conventional electrode mounted at an angle to said last means within said chamber, with the longitudinal axes of said last means and of said rod-like material being disposed in the same plane and in a parallel but spaced apart relationship, said conventional electrode having a pointed end positioned at a distance from said outer periphery of said rod-like material, means for advancing said conventional electrode along the axial length of said rod-like material with said pointed end maintained at said distance from said outer periphery of said material, and means for maintaining an electric arc between said pointed end of said conventional electrode and said outer periphery of said rod-like metallic material.

8. A method of making fine metallic powder comprising the steps of striking an electric arc between the pointed end of a conventional electrode and one end of an elongated and rotating consumable electrode advanceable toward the pointed end of said conventional electrode, the longitudinal axes of said conventional electrode and of said consumable electrode being axially aligned, maintaining said electric arc continuously to form liquid drops at said one end of said elongated and rotating consumable electrode, allowing said liquid drops to acquire the peripheral velocity of said rotating consumable electrode, and progressively casting off said liquid drops by centrifugal force from the periphery of said one end of said elongated and rotating consumable electrode.

References Cited in the file of this patent

UNITED STATES PATENTS

| | | |
|---|---|---|
| 513,270 | Kreinsen | Jan. 23, 1894 |
| 2,189,387 | Wissler | Feb. 6, 1940 |
| 2,439,772 | Gow | Apr. 13, 1948 |
| 2,795,819 | Lezberg et al. | June 18, 1957 |
| 2,897,539 | McMillan | Aug. 4, 1959 |
| 2,916,773 | Vonnegut | Dec. 15, 1959 |
| 2,987,773 | Stalego | June 13, 1961 |
| 3,021,562 | Chisholm et al. | Feb. 20, 1962 |